United States Patent
Wong et al.

(10) Patent No.: US 7,504,746 B2
(45) Date of Patent: Mar. 17, 2009

(54) DIFFERENTIAL LOAD DRIVER CIRCUITS

(75) Inventors: Foot Shen Wong, Singapore (SG); Haijun "Halley" Chen, Wuhan (CN); Mingpan Li, Wuhan (CN)

(73) Assignee: O2Micro International Limited, Grand Cayman (KY)

( * ) Notice: Subject to any disclaimer, the term of this patent is extended or adjusted under 35 U.S.C. 154(b) by 364 days.

(21) Appl. No.: 10/624,260

(22) Filed: Jul. 22, 2003

(65) Prior Publication Data

US 2004/0240135 A1     Dec. 2, 2004

(30) Foreign Application Priority Data

May 29, 2003    (CN)  ................................ 03 1 23949

(51) Int. Cl.
*H01H 47/00* (2006.01)
(52) U.S. Cl. ........................................ 307/115; 307/29
(58) Field of Classification Search ................. 307/29
See application file for complete search history.

(56) References Cited

U.S. PATENT DOCUMENTS 6,084,378 A * 7/2000 Carobolante ............... 318/811

6,791,390 B2 * 9/2004 Gay ............................ 327/332
2003/0103364 A1 * 6/2003 Alfrey ......................... 363/98
2003/0155813 A1 * 8/2003 Walter ......................... 307/31
2003/0155896 A1   8/2003 Ezio et al. ................... 323/280

FOREIGN PATENT DOCUMENTS

JP      2003-47260      2/2003

OTHER PUBLICATIONS

English translation of Summary of Relevance based on Preliminary Notice of Rejection to TW Patent Appli. No. 093102508 issued on Aug. 22, 2007.

* cited by examiner

*Primary Examiner*—Stephen W Jackson
*Assistant Examiner*—Dru M Parries

(57) ABSTRACT

A differential driving circuit is provided that reduces ripple current. The differential driving circuit is operable to supply a linear current in a low current mode and a PWM current in a high current mode. Depending on the direction of current flow through the load, heating and cooling is provided for loads such as a thermal electric cooler.

20 Claims, 8 Drawing Sheets

DIFFERENTIAL LOAD DRIVER CIRCUITS

This application claims priority to co-pending Chinese Application Ser. No. 03123949.8 filed May 29, 2003, the teachings of which are hereby incorporated by reference in its entirety.

FIELD OF THE INVENTION

The present invention relates to a differential load driver circuit, and more particularly, a differential load driver circuit that operates in both a linear mode for low current requirements and a PWM mode for high current requirements.

BACKGROUND OF THE INVENTION

PWM (Pulse Width Modulation) techniques are frequently used in power electronics to drive large load currents because of their high efficiency. In comparison, linear currents are almost never used in driving large load currents because of their poor efficiency. However, because there are no switching signals in a linear current source, the output current will not have any ripple. A PWM driven load current will inevitably experience some ripple, the amplitude dependent on the cutoff frequency and attenuation of the filtering network.

Figure 1:
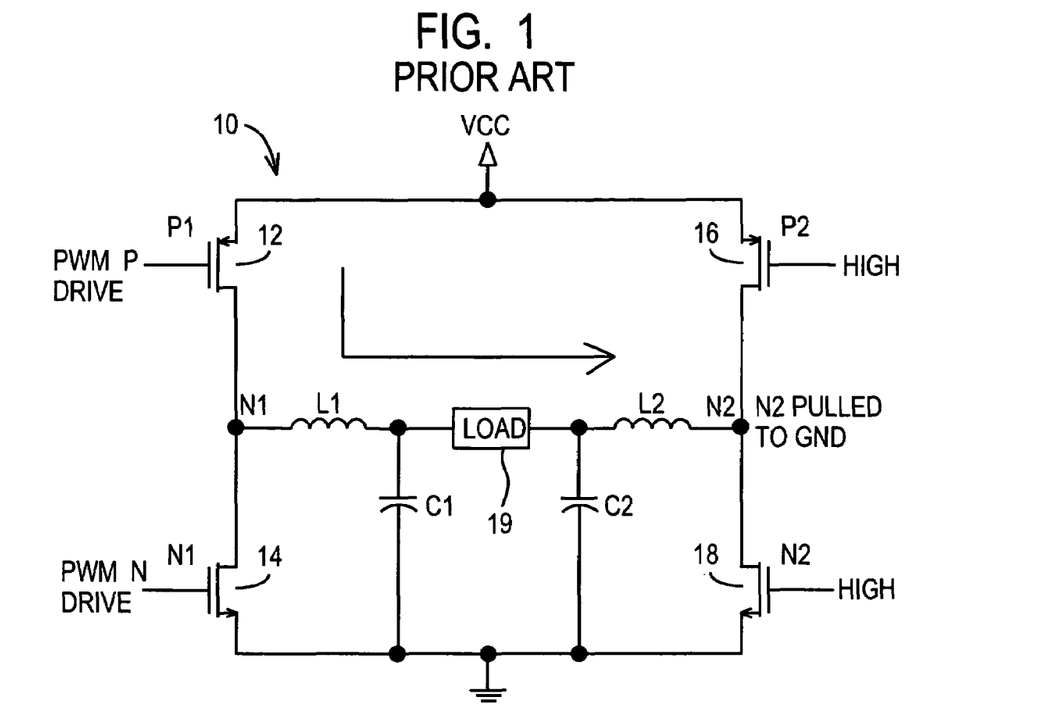
FIG. 1 is a conventional H-Bridge load driving circuit depicted in cooling mode of operation.
Figure 2:
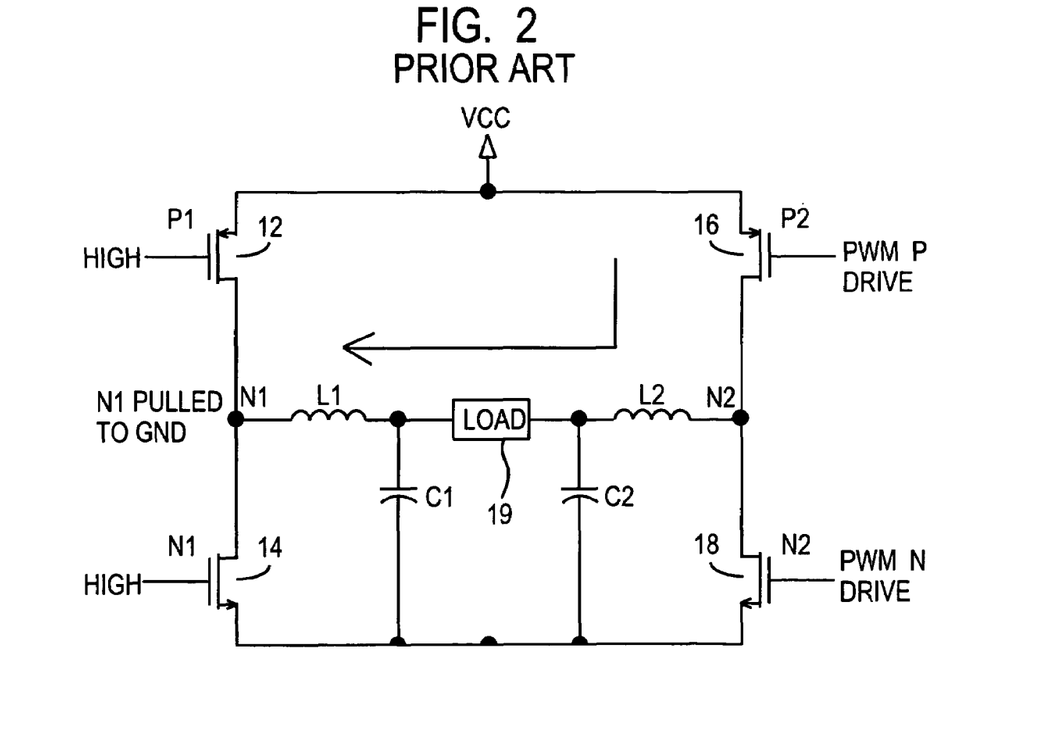
FIG. 2 is a conventional H-Bridge load driving circuit depicted in heating mode of operation.

Four power MOSFETs (Metal Oxide Semiconductor Field Effect Transistor) connected in an H-bridge are commonly used to drive a differential load. FIGS. 1 and 2 depict conventional H-Bridge circuits 10 used to drive a load. The H-Bridge circuit depicted in the figures includes four switches (12, 14, 16 and 18) arranged as shown to drive a load 19, as is well understood in the art.

FIG. 1 depicts current flowing from left to right, and shall be defined herein as "cooling". FIG. 2 depicts current flowing from right to left and shall be defined herein as "heating". FIGS. 1 and 2 show the signals required to drive 4 H-bridge connected power MOSFETs to drive a resistive load in the heating and cooling mode. For example, to drive the load in the cooling mode (FIG. 1), PWM signals are applied to P1 and N1. P2 is disabled and N1 is fully turned on. This operation is similar to a buck converter, as is known in the art. The duty cycle of the PWM signal will control the current flowing to the resistive load. Filter elements L1, C1, L2 and C2 will attenuate the ripple current though the load. Filter elements L1, C1, L2 and C2 will attenuate the ripple current through the load. Each switch has an associated pre-driver circuit (not shown) that drivers the switch at an appropriate level.

Such a design will experience some problems when small current is required through the load. At small load current, the duty cycle of the PWM signals is correspondingly reduced. However, the driving capability of pre-divers circuits is limited in terms of duty cycle. Moreover, the gate capacitance of power MOFSETs are quite significant. Hence, it is not possible to drive the MOFSETs at very small duty cycle. Moreover, the gate capacitances of the power MOFSETs are quite significant. Hence, it is not possible to drive the power MOFSETs at very small duty cycle resulting in the system not being able to output small load current in either the heating or cooling mode. Likewise, the percentage of ripple current will increase significantly as the average DC value of the load current decreases.

Figure 3:
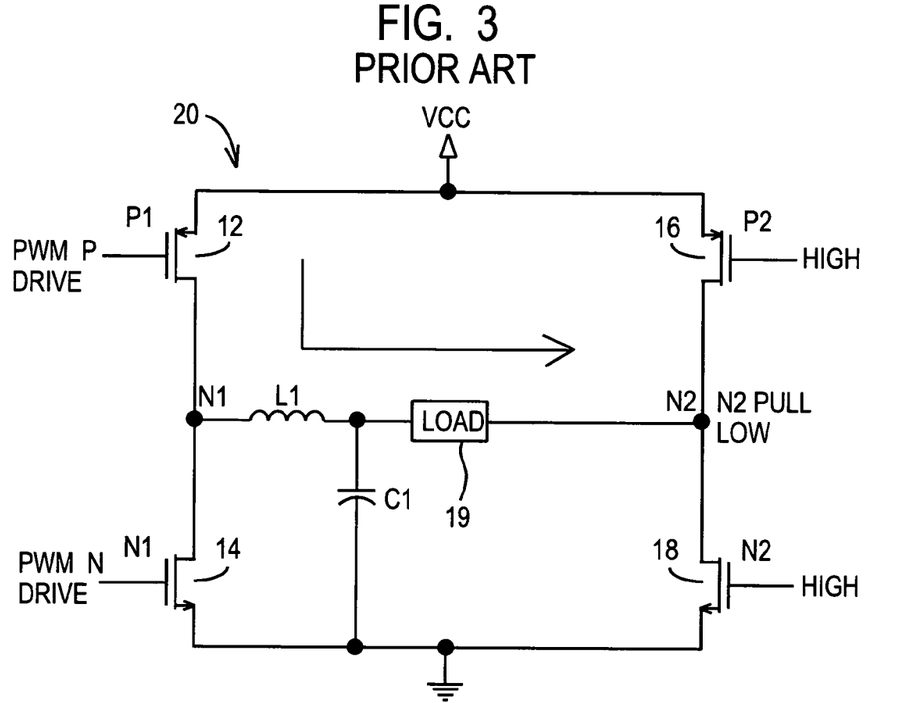
FIG. 3 is another conventional H-Bridge load driving circuit depicted in cooling mode of operation.
Figure 4:
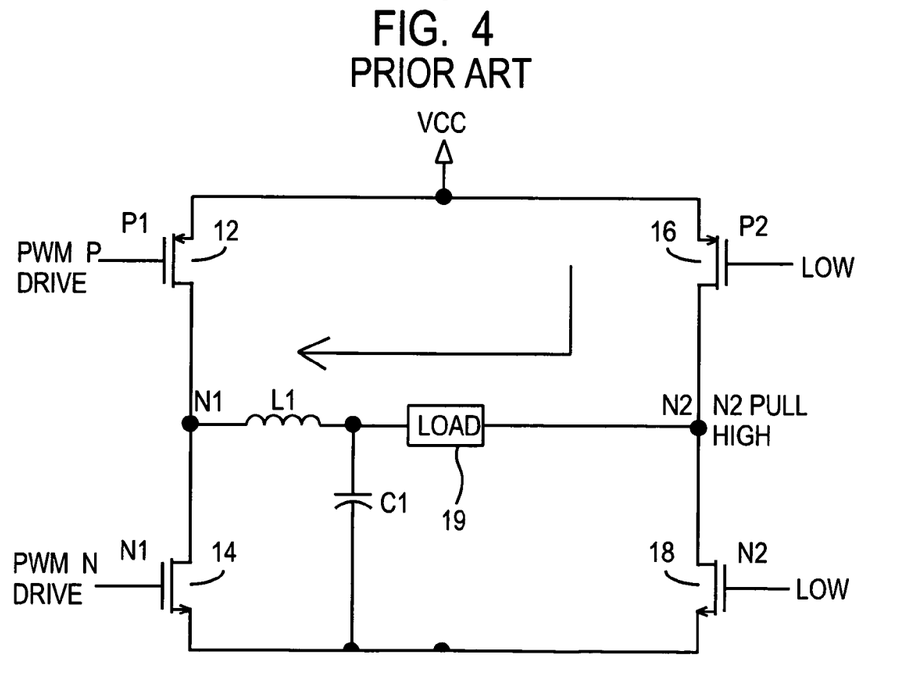
FIG. 4 is another conventional H-Bridge load driving circuit depicted in heating mode of operation.

FIGS. 3 and 4 show another variation of FIGS. 1 and 2 in which one set of the filter elements, L2 and C2, is removed. This generally results in costs saving and a smaller form factor. However, the circuit 20 of FIGS. 3 and 4 still suffers from the same deficiencies as the circuit of FIG. 1 and 2, i.e., increased ripple at low current conditions.

SUMMARY OF THE INVENTION

In one aspect, the present invention provides an H-Bridge load driving circuit, comprising four power switches forming an H-Bridge circuit selectively coupled to a load supply current to the load; and at least one current source; the circuit being adapted to couple the power switches or the current source to the load as a function of load current.

In another aspect, the present invention provides a differential load driving circuit comprising: a plurality of power switches selectively coupled to a load to supply current to the load; a plurality of power switch driving circuits operable to control the conduction state of the power switches and to selectively couple at least one of the plurality of power switches to a PWM signal; and at least one current source. The current source is coupled to the load to deliver current to the load during low current conditions at the load, and said PWM signal is coupled to the load to deliver current to the load during high current conditions at the load.

In another aspect, the present invention provides an H-Bridge load driving circuit, comprising four power switches forming an H-Bridge circuit selectively coupled to a load to supply current to the load; a plurality of power switch driving circuits operable to control the conduction state of the power switches and to selectively couple at least two of the plurality of power switches to a PWM signal; and at least one current source. The H-Bridge circuit has a first mode in which the current source is coupled to the load to supply current to the load and a second mode in which at least two of the power switches are coupled to the PWM signal to supply current to the load.

In yet another aspect, the present invention provides a differential driving circuit for driving a thermal electric cooler, the circuit comprising: a plurality of power switches selectively coupled to a thermal electric cooler load to supply current to the load; a plurality of power switch driving circuits operable to control the conduction state of the power switches and to selectively couple at least one of the plurality of power switches to a PWM signal; and at least one current source. The differential driving circuit has a first mode in which the current source is coupled to the load to supply current to the load and a second mode in which at least two of the power switches are coupled to the PWM signal to supply current to the load.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF THE EXEMPLARY EMBODIMENTS

In the following Detailed Description, the load 19 may include a Thermal Electrical Cooler (TEC). Such a device is operable in heating and cooling modes, depending on the direction of current flow. A TEC is used as a heating/cooling component to control precise temperature of devices, especially in Optical communication devices. When positive current passes through a TEC, the TEC will the heat device with precise temperature requirement and when negative current passes through the TEC, it will cool the device. However, the present invention is not intended to be limited by such a load or to any type of load.

The following Detailed Description shall proceed with a focus on the power train of the differential load driver. Conventional protection features associated with such applications such as over temperature and over current circuits will not be discussed, but may be included and are deemed within the spirit and scope of the present invention.

The present invention is directed to a differential load driver circuit (e.g., H-Bridge circuit) that operates in both linear mode and PWM mode. Linear mode operation is selected to reduce ripple current associated with low current operation of a differential load driver. The switchover point between linear and PWM operation may be programmable and/or user definable. The switchover point may be selected, based on, for example, the desired/tolerated ripple current at the load, the capacitance of the switches in the H-Bridge circuit, and/or other considerations. In other words, the differential load driving circuit of the present invention is operable between a linear current mode and a PWM current mode as a function of load current. Therefore, the term "low" associated with low current is to be construed broadly and may include any current delivered to a load. Likewise, the term "high" associated with high current conditions is relative to low current (but higher than low current) and should be construed as any current delivered to the load above the predefined low current delivered to the load.

Additionally, the following Detailed Description will proceed with describing various embodiments of an H-Bridge differential load driving circuit. The operation of an H-Bridge circuit is very well known in the art, and such discussion shall be omitted here.

I. First Embodiment

FIGS. 5-8 depict a differential load driver circuit 50 according to a first exemplary embodiment of the present invention. In this exemplary embodiment, switch driving circuits 52, 54, 56 and 58 (associated with each switch P1, P2, N1 and N2, respectively) are provided to control the operation of the power MOSFET switches. Current sources 60 and 62 are provided on each side of the H-Bridge to deliver linear current to the load.

Switch driving circuits 52, 54, 56 and 58 each include a plurality of switches (as shown). The plurality of switches are selectively operated to couple the power MOSFET switch to the PWM signal or the power supply (VCC), or the PWM signal, the power supply VCC or ground. Switches 64 and 66 are operated to couple current source 60 or 62, respectively to the load. In this exemplary embodiment, the switch driving circuits include three switches to couple the power MOSFET to the PWM signal, VCC and/or ground.

The switches included in the switch driving circuits 52, 54, 56 and 58 are exemplary and as for the case of 52 and 54 only one coupling to VCC is required. The p-type switches P1 and P2 are coupled to VCC during linear mode operation and the n-type devices (N1 and N2) are coupled to VCC and ground in an alternating fashion for both heating and cooling.

Figure 5:
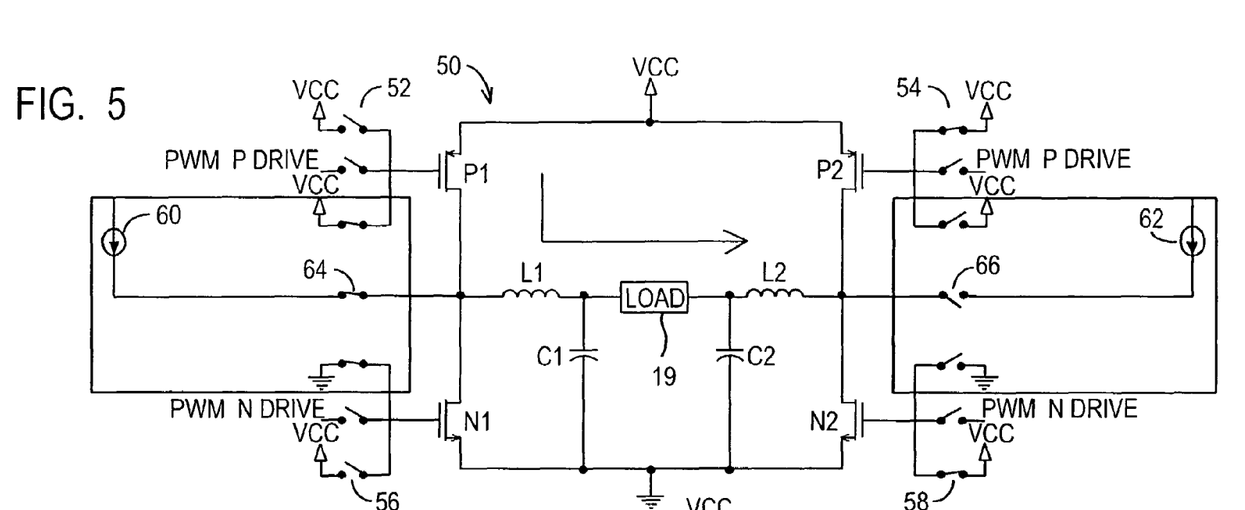
FIG. 5 is one exemplary circuit diagram of an H-Bridge load driver circuit operating in a linear cooling mode according to a first embodiment of the present invention.
Figure 7:
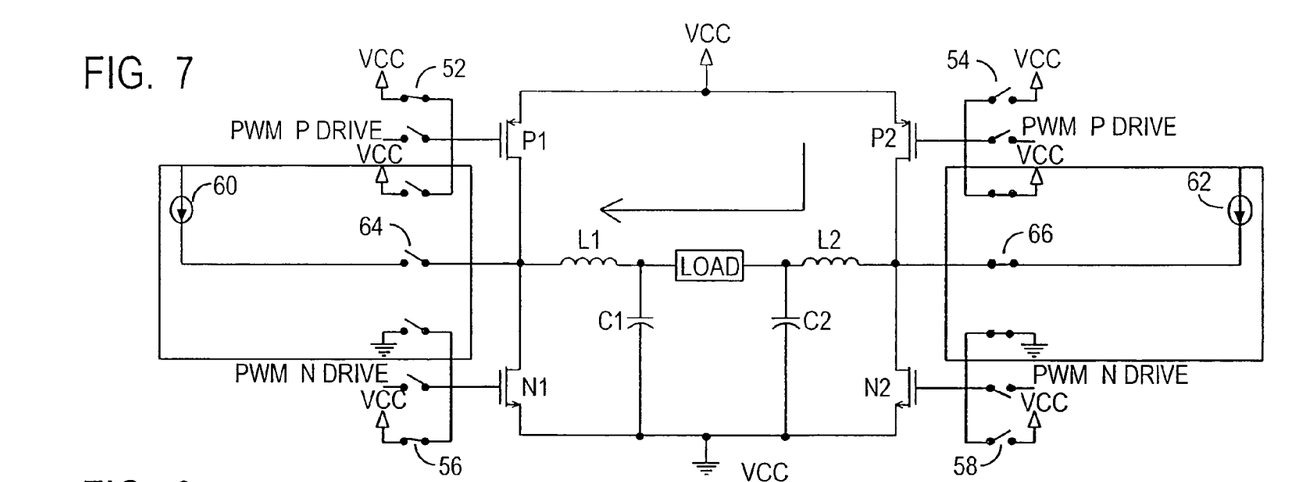
FIG. 7 is another exemplary circuit diagram of an H-Bridge load driver circuit operating in a linear heating mode according to a first embodiment of the present invention.
Figure 8:
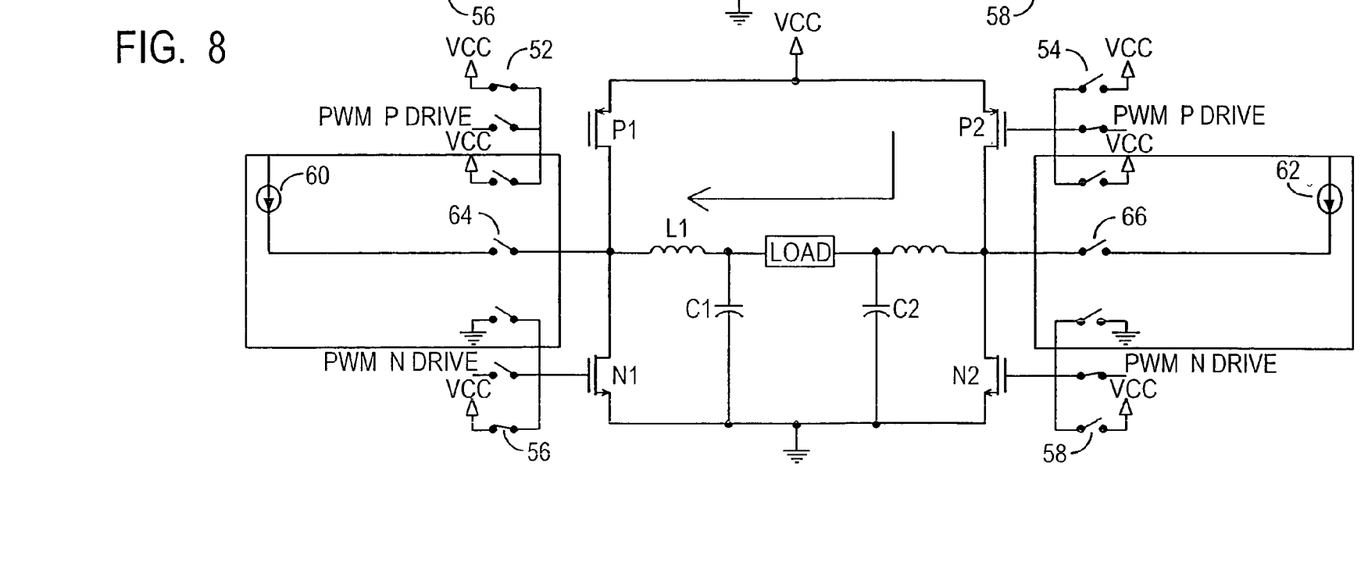
FIG. 8 is another exemplary circuit diagram of an H-Bridge load driver circuit operating in a PWM heating mode according to a first embodiment of the present invention.

FIG. 5 is one exemplary circuit diagram of the H-Bridge load driver circuit 50 operating in a linear cooling mode according to a first embodiment of the present invention. In this exemplary embodiment, during low current conditions required by the load 19 current source 60 is coupled to the load through switch 64. Current source 60 is generally defined as a linear current source and may include PMOS or NMOS devices in which the output current can be controlled through a voltage or current feedback (not shown, but such feedback control is well understood in the art). Power switches P1, P2 and N2 are rendered inoperable by switch driving circuits 52, 54 and 58. Since there are no switching signals when operating in this mode, the present invention therefore reduces and/or eliminates ripple current to the load. Also the current source can drive all the way to zero load current. FIG. 7 depicts the circuit 50 in linear heating mode in which current source 62 is coupled to the load 19 via switch 66.

Figure 6:
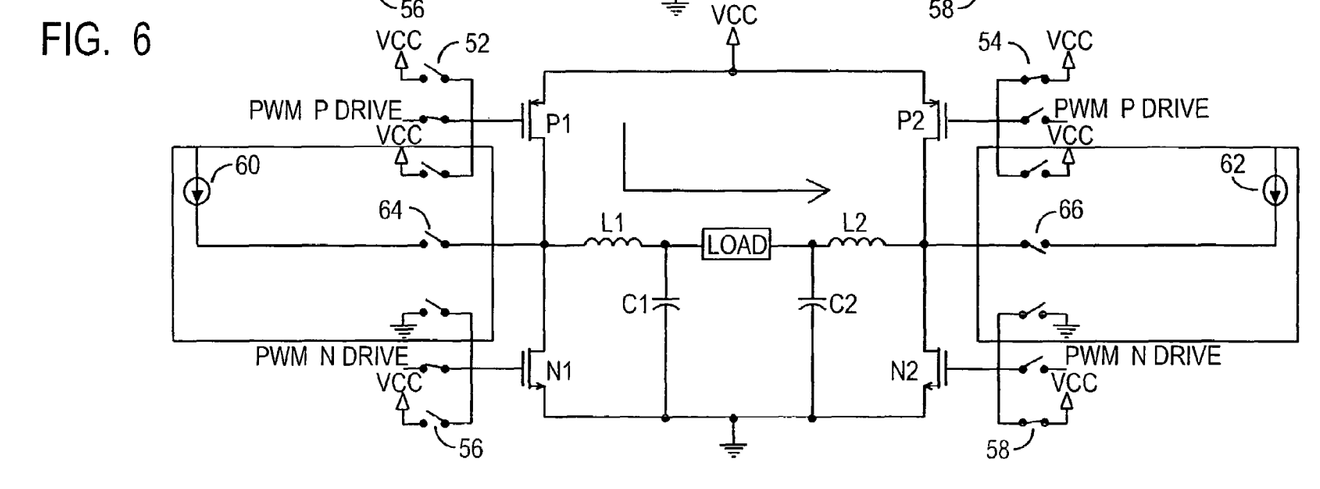
FIG. 6 is another exemplary circuit diagram of an H-Bridge load driver circuit operating in a PWM cooling mode according to a first embodiment of the present invention.

However, the current source will not be able to drive very large load current as power dissipation and efficiency will then become an issue. When large load current is required, the invention switches to PWM mode operation, as shown in FIG. 6 (cooling) and FIG. 8 (heating).

Figure 9:
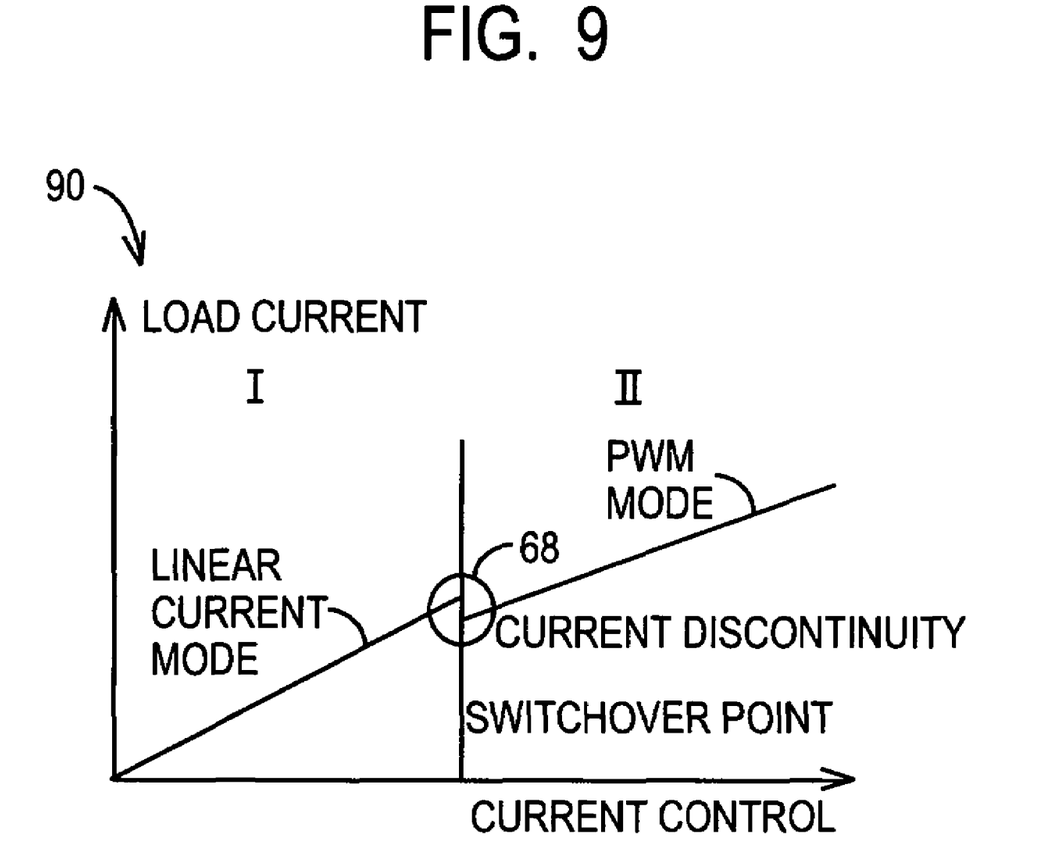
FIG. 9 depicts an exemplary graph showing the relationship between linear current mode and PWM mode of the present invention.

During the transition from linear to PWM and vice versa, the magnitude of the output current of the linear current sources 60, 62 must be comparable to the resultant current drive by the onset of the PWM mode of operation. It may be desirable (but not required) to reduce the difference in current discontinuity between PWM and linear mode. Such a requirement may help avoid potential oscillatory problems to the current source or the overall feedback system. FIG. 9 depicts a graph 90 showing the linear mode region I and PWM mode region II. The crossover point 68 is also depicted. As depicted in the figure, it may be desirable (but not required) to ensure that the PWM mode onset current is deliberately set slightly less than the linear mode current at the switch over point. This is to ensure all load current is covered by the current control. Current control can be a voltage or current feedback information from the load.

II. Second Embodiment

Figure 10:
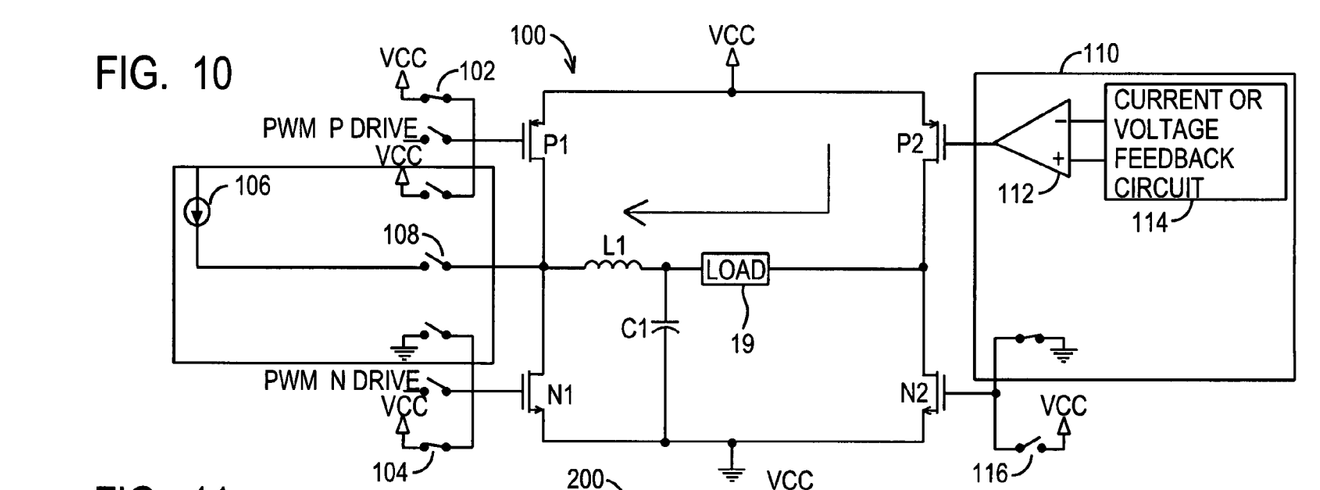
FIG. 10 is one exemplary circuit diagram of an H-Bridge load driver operating in a PWM heating mode according to a second embodiment of the present invention.

In applications where only small heating current is required, the embodiments of FIGS. 5-8 can be modified to reduce the number of reactive components by removing an LC set as depicted in the circuit 100 of FIG. 10. FIG. 10 is one exemplary circuit diagram of an H-Bridge load driver operating in a PWM heating mode according to a second embodiment of the present invention. Operation of the circuit 100 in low current linear heating mode is similar to the description above of FIGS. 5-8, and includes coupling current source 106 (via switch 108) to the load 19. In this embodiment, the switch driving circuits 102 and 104 are similar to switch driving circuits 52 and 56 of FIGS. 5-8. Switch P2 includes switch driving circuit 110. The current source in this case would be the external power PMOS P2 biased by the output of an OTA (output transconductance amplifier). A similar circuit can be constructed along these principles for small cooling current applications.

Switch driving circuit 110 is used as a bias circuit for PMOS element P2, and may include an opamp 112 and current or voltage feedback signals 114. The opamp is configured as a difference amplifier where the feedback signal is compared to a reference voltage to generate a bias signal to control the conduction state of P2 so that P2 operates as a current source. Of course, those skilled in the art will recognize that numerous current sources can be constructed and all deemed equivalent in the present invention.

III. Third Embodiment

Figure 11:
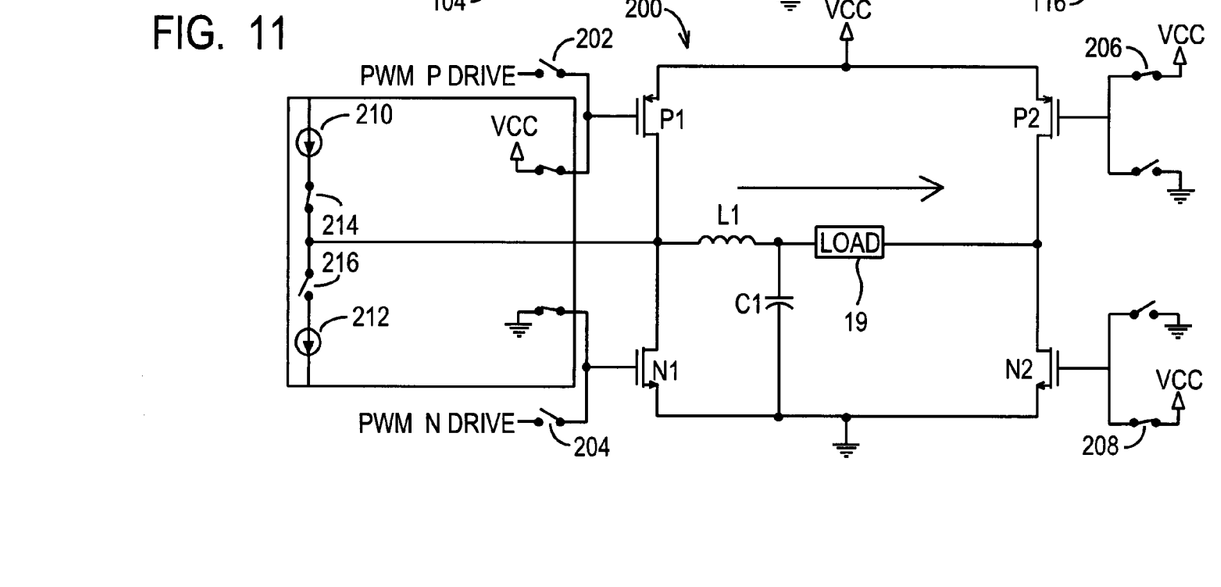
FIG. 11 is one exemplary circuit diagram of an H-Bridge load driver circuit operating in a linear cooling mode according to a third embodiment of the present invention.

In the embodiments of FIGS. 11-14, an LC filter set is eliminated. Unlike the previous embodiments, however, these embodiments are capable of delivering larger heating and cooling current. FIG. 11 is one exemplary circuit diagram of an H-Bridge load driver circuit 200 operating in a linear cooling mode according to a third embodiment of the present invention. In this embodiment 2 current sources 210 and 212 are used. Current source 210 is a source and current source 212 operates to sink current. When operating in the linear, cooling mode as shown in FIG. 11, current source 210 is coupled to the load (via switch 214), N2 is fully turned on and P2 is fully turned off. P1 and N1 are disabled. Switching circuits 202, 204, 206 and 208 couple the power MOSFETs to the appropriate source as shown in FIGS. 11-14 (i.e., to the PWM signal, VCC or ground).

Figure 13:
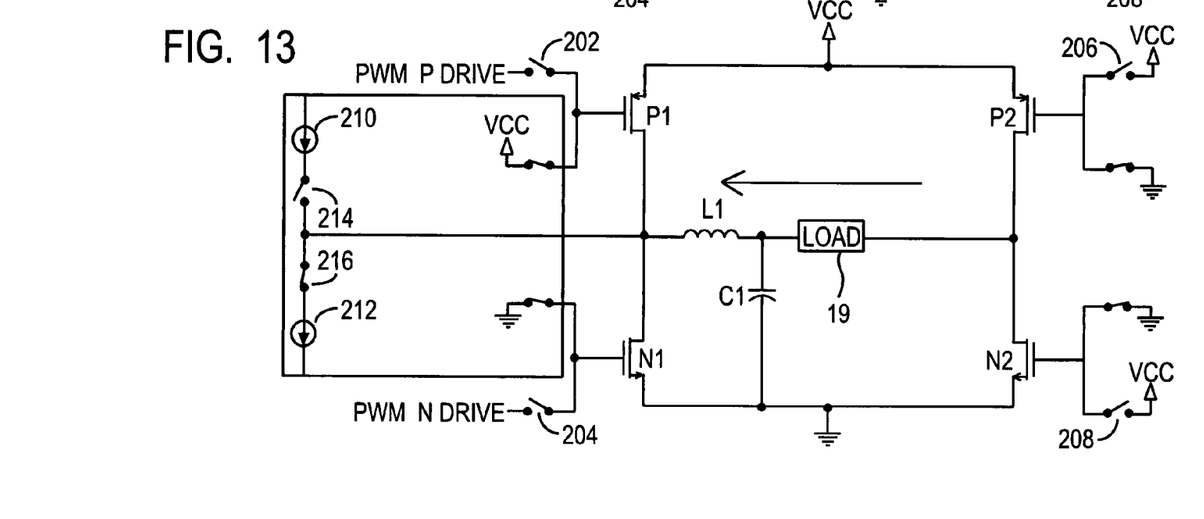
FIG. 13 is another exemplary circuit diagram of an H-Bridge load driver circuit operating in a linear heating mode according to a third embodiment of the present invention.

When operating in the linear heating mode as depicted in FIG. 13, source 212 is coupled to the load, P2 is fully turned on and N2 is fully turned off. P1 and N1 are disabled.

Figure 12:
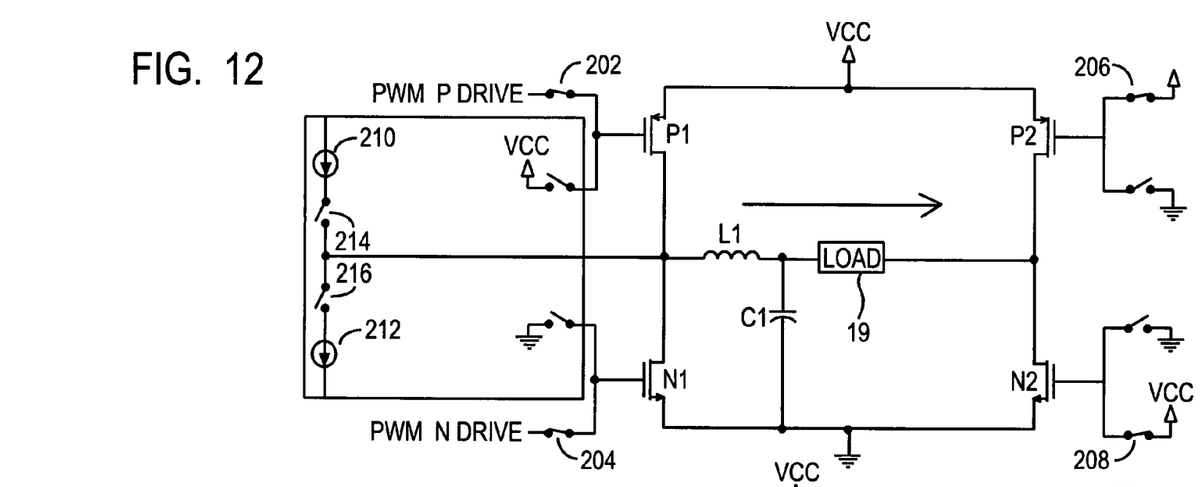
FIG. 12 is another exemplary circuit diagram of an H-Bridge load driver circuit operating in a PWM cooling mode according to a third embodiment of the present invention.
Figure 14:
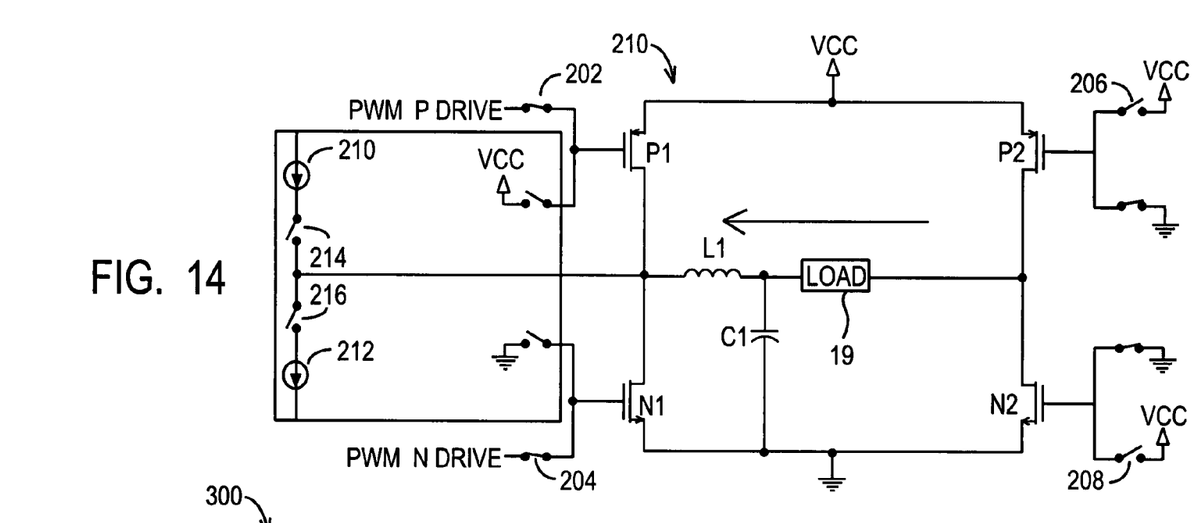
FIG. 14 is another exemplary circuit diagram of an H-Bridge load driver circuit operating in a PWM heating mode according to a third embodiment of the present invention.

FIGS. 12 and 14 depict the circuit 200 operating in PWM cooling mode and heating mode, respectively. In these states the current sources 210 and 212 are decoupled from the load 19 and P1 and N1 are driven by the PWM signal (via switch driver circuits 202 and 204). P2 and N2 alternate between VCC and ground.

Figure 15:
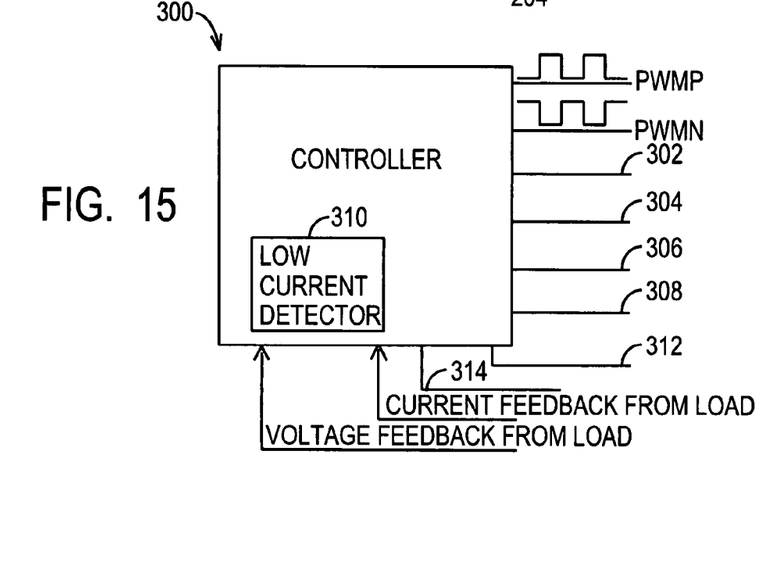
FIG. 15 is an exemplary controller for controlling the operation of a load driver circuit according to the present invention.

Of course, those skilled in the art will recognize that in the embodiments described herein a controller, as depicted in FIG. 15 may be implemented to control the conduction states of the switch driving circuits and current source switches depict. The output of the controller 300 may include complementary PWM signals PWM P and PWN N for driving the PMOS and NMOS devices of the differential load driving circuit. The controller may also output switch control signals 302-308 to control the operation of the switches in the switch driving circuits (e.g., 52, 54, 56 and 58 of FIGS. 5-8). The controller 300 may also generate switch control signals 312 and 314 to control the switches associated with the current sources (e.g., switches 64 and 66 associated with current sources 60 and 62 of FIGS. 5-8). The controller may use voltage and/or current feedback information as is well known in the art to control the power delivered to the load in both linear and PWM operation. Of course, certain embodiments described herein may not need all of the signals generated by the controller, and thus, the controller can be modified to generate appropriate signals. A low current detector circuit 310 may be included to control the switchover point between linear current mode and PWM current mode. Such a detector may further include a user definable input threshold which sets the threshold between low current and PWM mode. Of course, the detector circuit 310 may be omitted in place of a predefined input into the controller, where the predefined input represents the crossover supply current (as may be defined by a user). The controller can be a formed of custom and/or off the shelf components. Such PWM controllers are well understood in the art.

There will be numerous modifications that will become apparent to those skilled in the art. For example, although the present invention implements the differential load driver circuits with power MOSFET devices, other power switches known in the art can be used, for example BJT devices and/or other switch mechanisms. All such modifications or additions are deemed within the spirit and scope of the present invention, only as limited by the claims.

The invention claimed is:

1. A differential load driving circuit comprising:
a plurality of power switches coupled to a load and for transferring power to said load, wherein each power switch of said plurality of power switches is either fully on or fully off;
a plurality of power switch driving circuits for controlling switching states of said plurality of power switches respectively and for selectively coupling at least one power switch of said plurality of power switches to a PWM (pulse width modulation) signal so as to enable a PWM powering mode, said power switch driving circuits comprising a first switch driving circuit comprising:
a first switch that couples and decouples a first current source from said load;
a second switch coupled in parallel with said first switch and that couples and decouples a first power switch to Vcc;
a third switch coupled in parallel with said second switch and that couples and decouples said first power switch to said PWM signal;
a fourth switch coupled in parallel with said first switch and that couples and decouples a second power switch to ground; and
a fifth switch coupled in parallel with said fourth switch and that couples and decouples said second power switch to said PWM signal; and a controller for controlling said plurality of power switch driving circuits and for either selecting said PWM powering mode in which said PWM signal controls said at least one power switch or selecting a linear powering mode in which said first current source supplies current to said load, and for controlling a switchover point between said PWM powering mode and said linear powering mode according to a predetermined threshold to achieve a specified ripple current of said load.

2. A differential load driving circuit as claimed in claim 1, wherein said PWM powering mode comprises a cooling mode and a heating mode, and wherein a direction of current flowing through said load in said cooling mode is opposite to a direction of current flowing through said load in said heating mode.

3. A differential load driving circuit as claimed in claim 1, wherein said linear powering mode comprises a cooling mode and a heating mode, and wherein a direction of current flowing through said load in said cooling mode is opposite to a direction of current flowing through said load in said heating mode.

4. A differential load driving circuit as claimed in claim 3, further comprising a second current source, wherein said first current source supplies power to said load in said cooling mode, and wherein said second current source supplies power to said load in said heating mode.

5. A differential load driving circuit as claimed in claim 1, further comprising at least one filter circuit coupled between at least two power switches of said plurality of power switches and said load.

6. A differential load driving circuit as claimed in claim 1, wherein said load comprises a thermal electrical cooler.

7. A differential load driving circuit as claimed in claim 1, wherein at said switchover point, a load current in said PWM powering mode is slightly less than a load current in said linear powering mode.

8. A differential load driving circuit as claimed in claim 1, wherein said specified ripple current is above zero.

9. A differential load driving circuit as claimed in claim 1, wherein said controller comprises an input receiving said threshold.

10. A differential load driving circuit as claimed in claim 1, wherein said controller further receives a feedback signal from said load for controlling power delivered to said load in both said linear powering mode and said PWM powering mode.

11. A differential load driving circuit as claimed in claim 1, wherein said first current source is decoupled from said load in said PWM powering mode.

12. A differential load driving circuit comprising:
   a plurality of power switches coupled to a load and for selectively transferring power to said load under control of power switch driving circuits, wherein each power switch of said plurality of power switches is either fully on or fully off
   a first current source selectively coupled to said load and for supplying current to said load so as to enable a linear powering mode, wherein said power switch driving circuits include a first switch driving circuit comprising:
      a first switch that couples and decouples said first current source from said load;
      a second switch coupled in parallel with said first switch and that couples and decouples a first power switch to Vcc;
      a third switch coupled in parallel with said second switch and that couples and decouples said first power switch to a PWM signal;
      a fourth switch coupled in parallel with said first switch and that couples and decouples a second power switch to ground; and
      a fifth switch coupled in parallel with said fourth switch and that couples and decouples said second power switch to said PWM signal; and
   a controller for controlling said first, second, third, fourth and fifth switches and said first current source, and for either selecting a PWM powering mode in which a PWM (pulse width modulation) signal controls at least one power switch of said plurality of power switches or selecting said linear powering mode in which said first current source supplies current to said load, and for controlling a switchover point between said PWM powering mode and said linear powering mode according to a predetermined threshold to achieve a specified ripple current of said load.

13. A differential load driving circuit as claimed in claim 12, wherein said linear powering mode comprises a low current mode in which a direction of current through said load defines a cooling mode.

14. A differential load driving circuit as claimed in claim 12, wherein said linear powering mode comprises a low current mode in which a direction of current through said load defines a heating mode.

15. A differential load driving circuit as claimed in claim 12, wherein said PWM powering mode comprises a high current mode in which a direction of current through said load defines a cooling mode.

16. A differential load driving circuit as claimed in claim 12, wherein said PWM powering mode comprises a high current mode in which a direction of current through said load defines a heating mode.

17. A differential load driving circuit as claimed in claim 12, further comprising: a plurality of power switch driving circuits for controlling switching states of said plurality of power switches respectively and for selectively coupling at least one power switch of said plurality of power switches to said PWM signal so as to enable said PWM powering mode.

18. A differential load driving circuit as claimed in claim 12, further comprising: at least one current source switch for coupling said first current source to said load so as to enable said linear powering mode.

19. A differential load driving circuit as claimed in claim 12, wherein said controller further receives a feedback signal from said load for controlling power delivered to said load in both said linear powering mode and said PWM powering mode.

20. A differential load driving circuit as claimed in claim 12, wherein said first current source is decoupled from said load in said PWM powering mode.

* * * * *